United States Patent
Enomoto

(10) Patent No.: US 6,695,122 B2
(45) Date of Patent: Feb. 24, 2004

(54) CHIP CONVEYER AND CHIP-SEPARATION/ RECOVERY APPARATUS

(75) Inventor: Yukio Enomoto, Gifu (JP)

(73) Assignee: Enomoto Industry Company, Ltd., Gifu (JP)

( * ) Notice: Subject to any disclaimer, the term of this patent is extended or adjusted under 35 U.S.C. 154(b) by 0 days.

(21) Appl. No.: 10/088,609
(22) PCT Filed: Jul. 16, 2001
(86) PCT No.: PCT/JP01/06119
§ 371 (c)(1), (2), (4) Date: Mar. 14, 2002
(87) PCT Pub. No.: WO02/06004
PCT Pub. Date: Jan. 24, 2002

(65) Prior Publication Data
US 2002/0134648 A1 Sep. 26, 2002

(30) Foreign Application Priority Data
Jul. 19, 2000 (JP) .......................................... 2000-219531

(51) Int. Cl.$^7$ ............................................. B65G 45/22
(52) U.S. Cl. ...................... 198/495; 409/137; 210/523; 210/531; 82/52; 82/901
(58) Field of Search ......................... 198/495; 409/137; 210/531, 523; 82/52, 901

(56) References Cited

U.S. PATENT DOCUMENTS

| | | | | |
|---|---|---|---|---|
| 6,035,996 A | * | 3/2000 | Swift | 198/495 |
| 6,357,576 B1 | * | 3/2002 | Enomoto | 198/495 |
| 6,511,597 B2 | * | 1/2003 | Hori et al. | 210/523 |

FOREIGN PATENT DOCUMENTS

| | | |
|---|---|---|
| JP | 5955645 | 4/1984 |
| JP | 61191849 | 11/1986 |
| JP | 62099048 | 5/1987 |
| JP | 63123656 | 5/1988 |
| JP | 01176412 | 7/1989 |
| JP | 344540 | 4/1991 |
| JP | 717450 | 3/1995 |
| JP | 10058273 | 3/1998 |

* cited by examiner

Primary Examiner—Joseph E. Valenza
(74) Attorney, Agent, or Firm—Sawyer Law Group LLP

(57) ABSTRACT

A chip conveyer including an endless conveying member (18) that circulates in a predetermined direction for receiving chips discharged from a machine tool in a receiving zone, conveying the chips to a discharge position (E2) spaced from the receiving zone at a predetermined interval, and discharging the chips at the discharge position. A conveying member (18) travels along a forward route (R2) from an end (E1) of the receiving zone to a turning point (E2) of the conveying member (18), discharges the chips at the turning point (E2), and travels along a return route (R3) from the turning point (E2) to a return point (E3) where the conveying member (18) is returned to the receiving zone. The conveying member (18) enters the liquid reservoir (31) while moving along the return route (R3) such that the chips adhered to the conveying member due to an oil component are separated in liquid in the liquid reservoir (31). A liquid supply device supplies the liquid to the liquid reservoir (31). A screw conveyer (45) discharges the separated chips from the liquid reservoir to the exterior. The liquid reservoir (31) has a liquid discharge pipe (57) for discharging excessive liquid. A suppressing means suppresses escaping of bubbles from the liquid discharge means (57).

24 Claims, 7 Drawing Sheets

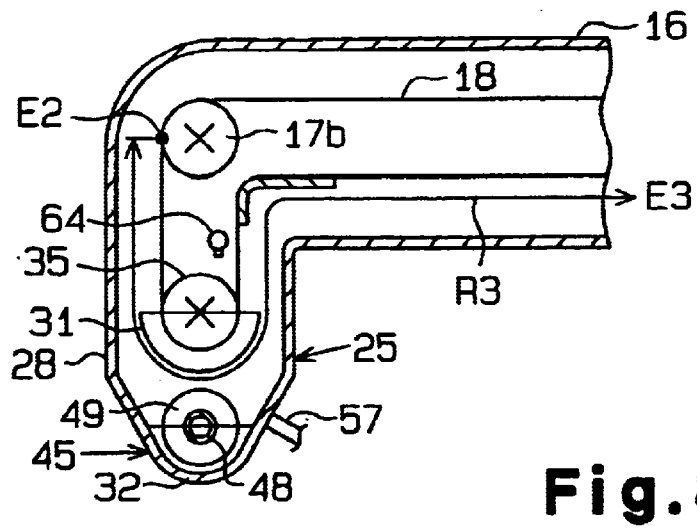
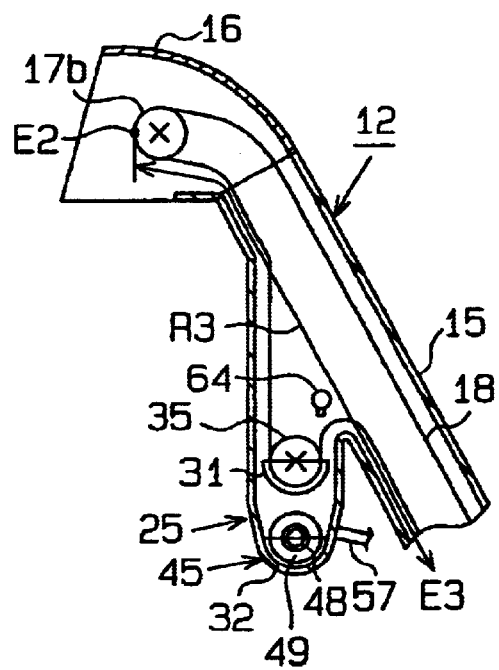
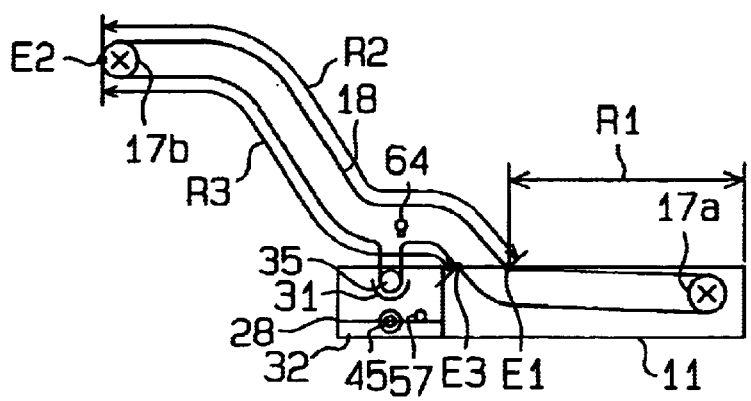

CHIP CONVEYER AND CHIP-SEPARATION/RECOVERY APPARATUS

BACKGROUND OF THE INVENTION

This invention relates to a chip conveyer for conveying cutting chips that are produced in the operation of a machine tool, such as a lathe or the like, and contain machine oil from a receiving position to a discharge position, and a chip-separating/recovery apparatus used with the chip conveyer.

As a conventional chip conveyer, the chip conveyer disclosed in Japanese Laid-Open Utility Model Publication No. 59-55645 has been proposed. This chip conveyer includes a circulating conveying member and a bucket removably located at the discharge position of the chips. Chips containing cutting oil are conveyed by the conveying member to the discharge position, and just after the chips reach the discharge position, the chips are received by the bucket. A number of small holes for filtering the cutting oil are provided in the bottom portion of the bucket.

Further, air is sprayed from the outlet of nozzle on the lower surface of the conveying member so that chips that have adhered to the lower surface of the conveying member fall into the bucket. The cutting oil adhered to the chips is recovered through an oil recovery pipe from the number of small holes of the bucket.

On the other hand, the present applicant proposed a chip conveyer disclosed in Japanese Laid-Open Patent Publication No. 63-123656. In this chip conveyer, an endless type mesh belt is provided inside a horizontal frame and an inclined frame. A liquid tank for storing storage liquid is located at the chip receiving position. Chips in the tank are removed by circulation of the belt. A spraying member is arranged between the upper and lower traveling portions of the mesh belt. The spraying member prays cleaning fluid toward the lower traveling portion of the mesh belt, thereby cleaning the lower traveling portion of the mesh belt.

However, the chip conveyer of Japanese Laid-Open Utility Model Publication No. 59-55645 may not reliably isolate and recover chips adhered to the lower surface of the conveying member due to the oil through the air injection from the nozzle. The chips may be separated from the conveying member by raising the pressure of the air injected from the nozzle. However, this requires a structure for preventing the air and chips from being blown away and a supply source of the pressurized air.

Also, in the chip conveyer of Japanese Laid-Open Patent Publication No. 63-123656, the chips cannot be reliably removed by only spraying the cleaning fluid on the mesh belt. Further, not only is a special structure for preventing the flying of cleaning fluid and chips needed, but also a supply source for a high-pressure fluid is needed.

If a piece of a chip is adhered to the conveying member, the chip can enter between sliding parts forming the conveying member to wear the parts. Further, the chip can enter between sliding parts of a mechanism that drives the conveying member, which will degrade the durability of the driving mechanism. Moreover, when the remaining chips fall at the receiving position and accumulate in the bottom of the recovery tank, the accumulated chips must be manually removed frequently.

A screw conveyer may be provided below the recovery tank, which is located at the chip receiving position. However, since the tank is usually provided on the ground, it is necessary to form an underground pit, which greatly increases the installing cost. To prevent the provision of an underground pit, the recovery tank may be located at a position higher than the ground. However, in this case, the machine tool itself, other than the tank, must also be located at a position higher than the ground, which also increases costs greatly. Further, the working position of workpieces becomes higher than necessary and the operation becomes inconvenient.

Some of the chips received by the chip conveyer do not fall in a recovery box at the discharge position but remain adhered to the conveyer and return to the receiving position. The chips are accumulated in the recovery tank at the receiving position. Since the amount of the accumulated chips is relatively large, for example, more than fifty percent in the case of aluminum machining, the recovery tank quickly becomes full. In this case, the machine tool must be stopped to empty the cutting water is emptied and to remove the remaining chips. This must be repeated for, for example, once in two or three days.

To solve this problem, it is an objective of the present invention to provide a chip conveyer that separates and recovers chips from a conveying member by immersing the conveying member in coolant liquid retained in a liquid reservoir, so that the durability of the conveying member and that of a drive mechanism are improved, and suppresses escaping of the chips to a recovery tank, together with a large amount of bubbles generated in the liquid reservoir, when the coolant liquid in the liquid reservoir is new.

In addition to the above, it is another objective of the present invention to provide a chip separation recovery apparatus that has a simple structure and is easily attached to and detached from a discharge portion of a chip conveyer.

BRIEF SUMMARY OF THE INVENTION

To achieve the aforementioned objectives, a preferred embodiment of the present invention provides a chip conveyer including an endless conveying member that circulates in a predetermined direction for receiving chips discharged from a machine tool in a receiving zone, conveying the chips to a discharge position spaced from the receiving zone at a predetermined interval, and discharging the chips at the discharge position. In the chip conveyer, the receiving zone has a predetermined length corresponding to the length of the machine tool. The conveying member travels along a forward route from an end of the receiving zone to a turning point of the conveying member, discharges the chips at the turning point, and travels along a return route from the turning point to a return point where the conveying member is returned to the receiving zone. A liquid reservoir is located at a position corresponding to the return route such that the conveying member enters the liquid reservoir while moving along the return route. This separates the chips adhered to the conveying member in liquid in the liquid reservoir. A liquid supply device for supplying the liquid to the liquid reservoir is provided. A chip discharge means for discharging the separated chips to the exterior is located in the liquid reservoir. A liquid discharge means for discharging excessive liquid is located in the liquid reservoir or the chip discharge means. A suppressing means for suppressing escaping of bubbles from the liquid discharge means is provided.

It is preferred that the conveying member include a scraper and the liquid reservoir include a first liquid reservoir and a second liquid reservoir located below the first liquid reservoir. In this case, the scraper of the conveying member causes the chips separated in the liquid in the first liquid reservoir to fall in the second liquid reservoir, together with the liquid. It is preferred that the second liquid reservoir accommodate the chip discharge means and the liquid discharge means be a liquid discharge pipe connected to the second liquid reservoir.

It is preferred that the suppressing means include a structure that suppresses the escaping of the bubbles by reducing the volume of the liquid in the first liquid reservoir and the surface area corresponding to a liquid level of the first liquid reservoir and a structure that suppresses the escaping of the bubbles by reducing the volume of the liquid in the second liquid reservoir and the surface area corresponding to a liquid level of the second liquid reservoir.

It is preferred that the surface areas corresponding to the liquid levels in the first and second liquid reservoirs be reduced by lowering the liquid levels.

It is preferred that the liquid discharge pipe supply the liquid to the liquid reservoir by means of the conveying member by dropping or spraying the liquid on the conveying member in the return route at an upstream or downstream position with respect to the liquid reservoir.

It is preferred that the conveying member proceed into the liquid of the liquid reservoir through a lowered roundabout route. It is also preferred that the liquid supply device pump the liquid from a recovery tank located in the receiving zone and the liquid discharge means cause excessive liquid to fall in the recovery tank.

Another embodiment of the present invention provides a chip separation recovery apparatus for a chip conveyer. The apparatus includes a liquid reservoir for retaining liquid in which a conveying member is immersed while moving along a return route, a turning mechanism located at a position corresponding to the liquid reservoir for causing the conveying member to take a roundabout route, a chip discharge means for discharging chips retained in the liquid reservoir, a liquid discharge means for discharging excessive liquid from the liquid reservoir, and a suppressing means for suppressing escaping of bubbles from the liquid discharge means.

BRIEF DESCRIPTION OF THE DRAWINGS

FIG. 7 is a main portion cross-sectional view showing another embodiment;

FIG. 8 is a main portion cross-sectional view showing another embodiment;

FIG. 9 is a main portion front view showing another embodiment;

DETAILED DESCRIPTION OF THE PREFERRED EMBODIMENTS

One embodiment, in which the present invention is embodied in a chip conveyer used in a machine tool, will now be described with reference to FIGS. 1 to 3.

Figure 3:
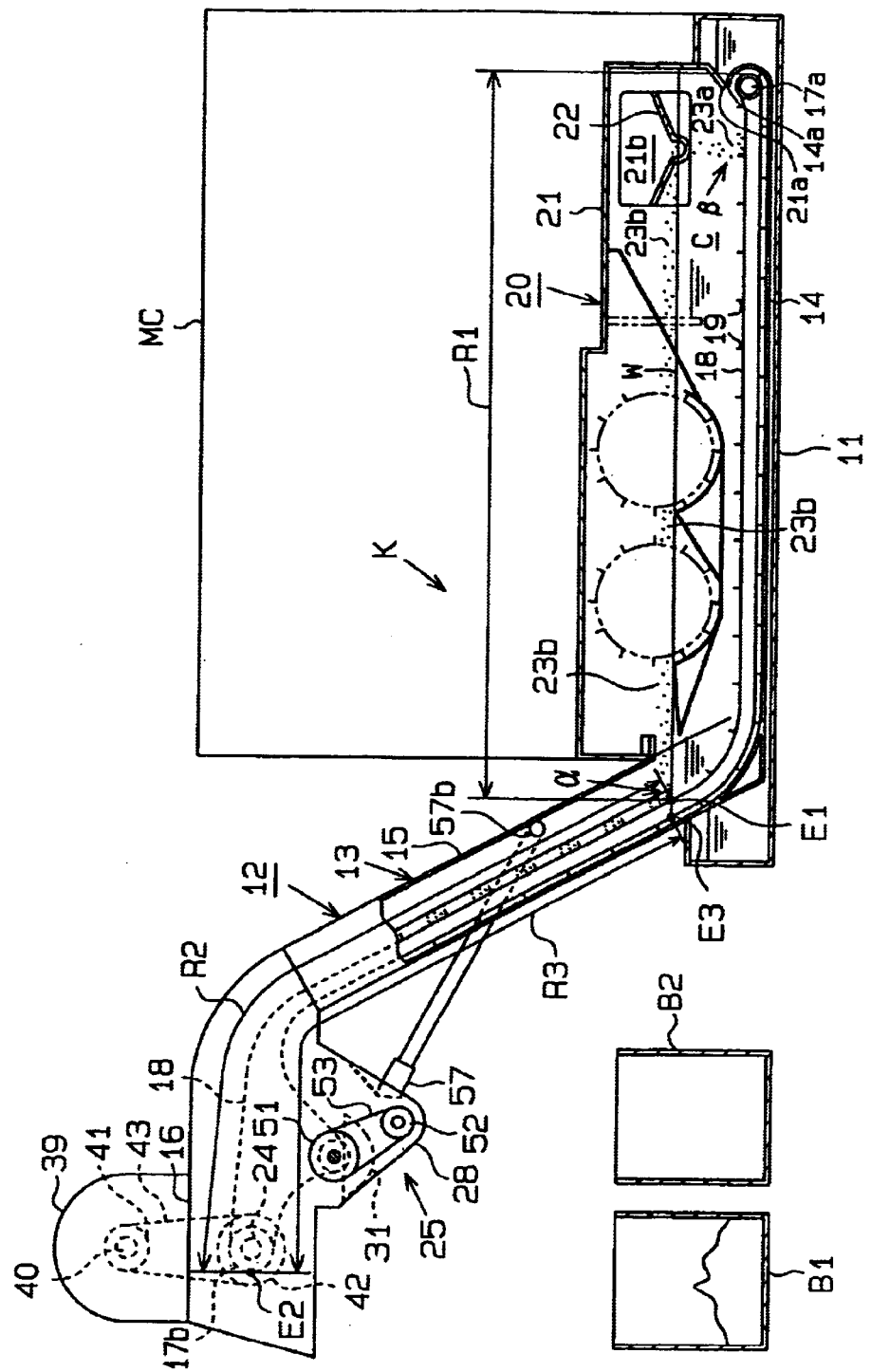
FIG. 3 is a cross-sectional view showing an entire chip conveyer.

FIG. 3 shows an entire chip conveyer K. A machine tool MC is located on a side of the chip conveyer. When a cutting operation of an article is carried out by the machine tool MC, chips are produced. The chip conveyer K is mounted on a floor surface so that the chips can be recovered from the machine tool MC and conveyed to another position.

A recovery tank 11, within which a water-soluble or oily coolant liquid C is stored, is located at a chip receiving position. The lower horizontal portion of a conveyer body 12 is provided in the recovery tank 11. A trough 13 of the conveyer body 12 includes a receiving portion 14, which extends horizontally in the recovery tank 11, a raised portion 15, which extends obliquely upward from the receiving portion 14, and a discharge portion 16, which extends substantially horizontally from the upper end of the raised portion 15 to a discharge position.

Sprocket wheels 17a and 17b are rotatably supported in the receiving portion 14 and the discharge portion 16 of the trough 13, respectively, and an endless type conveying member 18 is looped between the sprocket wheels 17a and 17b. A plurality of scrapers 19 are provided on the outer surface of the conveying member 18 and spaced apart by predetermined distances.

Above the conveying member 18, a filtration apparatus 20 is provided on the receiving portion 14 of the trough 13. The filtration apparatus 20 includes a casing 21. A lower opening 21a of the casing 21 communicates with an upper opening 14a of the receiving portion 14. An introduction inlet 21b of the casing 21 is formed in the side wall on an upstream side of the casing 21, and into the introduction inlet 21b is inserted the downstream end of a trough 22 extending into the casing 21. A coolant liquid C containing the chips 23 discharged from the machine tool flows into the casing 21 through the trough 22. The chips 23 are separated into heavy chips 23a, which fell into the lower portion from the liquid level W of the coolant in the casing 21, and light chips 23b, which floats on the liquid level W of the coolant. The light chips 23b are received by the conveying member 18 at a position α where the conveying member 18 in the raised portion 15 crosses the coolant liquid level W. Further, the heavy chips 23a are received by the conveying member 18 at a position β where the conveying member 18 faces the trough 22.

In this embodiment, as shown in FIG. 3, the chips 23 are discharged into the recovery tank 11 located relative to the machine tool MC from the machine tool MC through the trough 22. The receiving region of the chips 23 extends horizontally along the machine tool MC and is set to a given length. The upper portion and the lower portion of the conveying member 18 in the receiving region are defined as a receiving route R1. A point E1 is located at an end of the receiving region (the receiving route R1) of the conveying member 18. A point E2 is located at a position where the conveying member 18 is turned back by the sprocket wheel 17b. Part of the conveying member 18 from the point E1 to the point E2 is defined as a forward route R2 of the upper portion. Further, a region where the conveying member 18 is turned back from the turning point E2 to the starting point E3 of the receiving position (receiving route R1) is defined as a return route R3. The forward route R2 and the return route R3 are substantially parallel.

The discharge portion 16 includes a pair of side walls 26, 26, which support a supporting shaft 24 of the sprocket wheel 17b, and the respective ends and the lower sides of the both side walls 26, 26 are opened. Some of the chips conveyed by the conveying member 18 fall down from the conveying member 18 as it turns at the opening of the end portion as shown by an arrow in FIG. 1, and are recovered by the recovery box B1 shown in FIG. 3.

To the lower end portions of the side walls 26, 26 is attached the separation/recovery apparatus 25, which separates and recovers chips 23 that adhere to the conveying member 18 and have not fallen at the turning point E2.

The chip separation recovery apparatus 25 will now be described.

Metal flanges 27, 27 are securely welded to lower outer sides of the side walls 26, 26. Metal flanges 29, 29, which are welded to upper inner sides of a casing 28, are detachably attached to the metal flanges 27, 27 by bolts 30 and nuts. An upper opening of the casing 28 is connected to a lower opening of the discharge portion 16. With reference to FIG. 1, the casing 28 has a substantially V-shaped cross-sectional shape. A lower portion of the casing 28 has an arcuate cross-sectional shape.

A first liquid reservoir 31 for retaining the coolant liquid C is formed in an upper inner portion of the casing 28. A second liquid reservoir 32 is formed in the lower portion of the casing 28. The first liquid reservoir 31 is located under an opening formed in a bottom plate of the trough 13. A support shaft 33 corresponding to the first liquid reservoir 31 is rotationally supported by the casing 28 with bearings 34, 34. A pair of sprocket wheels 35, 35 is attached to the support shaft 33 for causing the conveying member 18 to take a roundabout route passing through the first liquid reservoir 31. Guide flanges 36, 37 for guiding opposite sides of the conveying member 18 are formed at inner sides of the side walls 26, 26. In this embodiment, the support shaft 33, the bearings 34, 34, and the sprocket wheels 35, 35 form a turning mechanism 38 for the conveying member 18.

A liquid level S1 of the coolant liquid C retained in the first liquid reservoir 31 is determined by an end 31a of the first liquid reservoir 31 at a chip discharge side. By causing a portion of the conveying member 18 to take a roundabout route through the first liquid reservoir 31 while immersing the portion in the coolant liquid C, the chips 23 adhered to the conveying member 18 are isolated. The scrapers 19 of the conveying member 18 cause the isolated chips 23, together with the coolant liquid C, to fall from the first liquid reservoir 31 to the second liquid reservoir 32. A chip discharge means, or a screw conveyer 45, discharges the chips 23 from the second liquid reservoir 32 to the exterior.

As shown in FIG. 3, a motor 39 is fixed to the upper surface of the discharge portion 16. A drive sprocket wheel 41 is attached to the output shaft 39a of the motor 39. On a supporting shaft 24, which supports the sprocket wheel 17b, a driven sprocket wheel 42 is provided. A chain 43 is looped over the drive sprocket wheel 41 and the driven sprocket wheel 42. The motor 39 drives the conveying member 18 to circulate counterclockwise as viewed in FIG. 3 along the receiving portion 14, the raised portion 15 and the discharge portion 16. After passing the turning point E2, the conveying member 18 takes a roundabout route and enters the first liquid reservoir 31.

The screw conveyer 45 will now be described.

A discharge trough 28a is formed in the lower portion of the casing 28 parallel to the support shaft 33. The discharge trough 28a forms a second liquid reservoir 32. A rotary shaft 47 is supported on one side wall 28b of the casing 28 relative to this discharge trough 28a. A mounting shaft tube 48 is fitted to the rotary shaft 47. A screw rotor 49 is welded to the outer periphery of the mounting shaft tube 48. A pin 50 connects the rotary shaft 47 and the mounting shaft tube 48. To the outer end of the support shaft 33 is mounted a drive sprocket wheel 51 and to the outer end of the rotary shaft 47 is fitted and fixed a driven sprocket wheel 52. A chain 53 is looped over the sprocket wheels 51, 52.

A protection cover 54 for protecting the sprocket wheels 51, 52 and the chain 53 is located along an outer wall of the casing 28. The bearings 34, 46 function as seals for preventing the coolant liquid C from entering an inner space 55 defined by the protection cover 54. An opening 56 is formed at a proximal end of the discharge trough 28a. An end of a liquid discharge pipe 57 that discharges excessive coolant liquid C is connected to the opening 56. Referring to FIG. 1, the lower end of an inlet 57a of the liquid discharge pipe 57 is located at a height corresponding to the axis O of the mounting shaft tube 48, such that a liquid level S2 of the coolant liquid C in the second liquid reservoir 32 is maintained at a predetermined level. Referring to FIG. 2, the liquid discharge pipe 57 is connected to the second liquid reservoir 32 at a proximal end (an upstream end) of the second liquid reservoir 32 with respect to a chip discharge direction of the screw conveyer 45. A distal outlet 57b of the liquid discharge pipe 57 is connected to the raised portion 15 of the trough 13, with reference to FIG. 3, to return excessive liquid to the discharge starting point E1.

Figure 2:
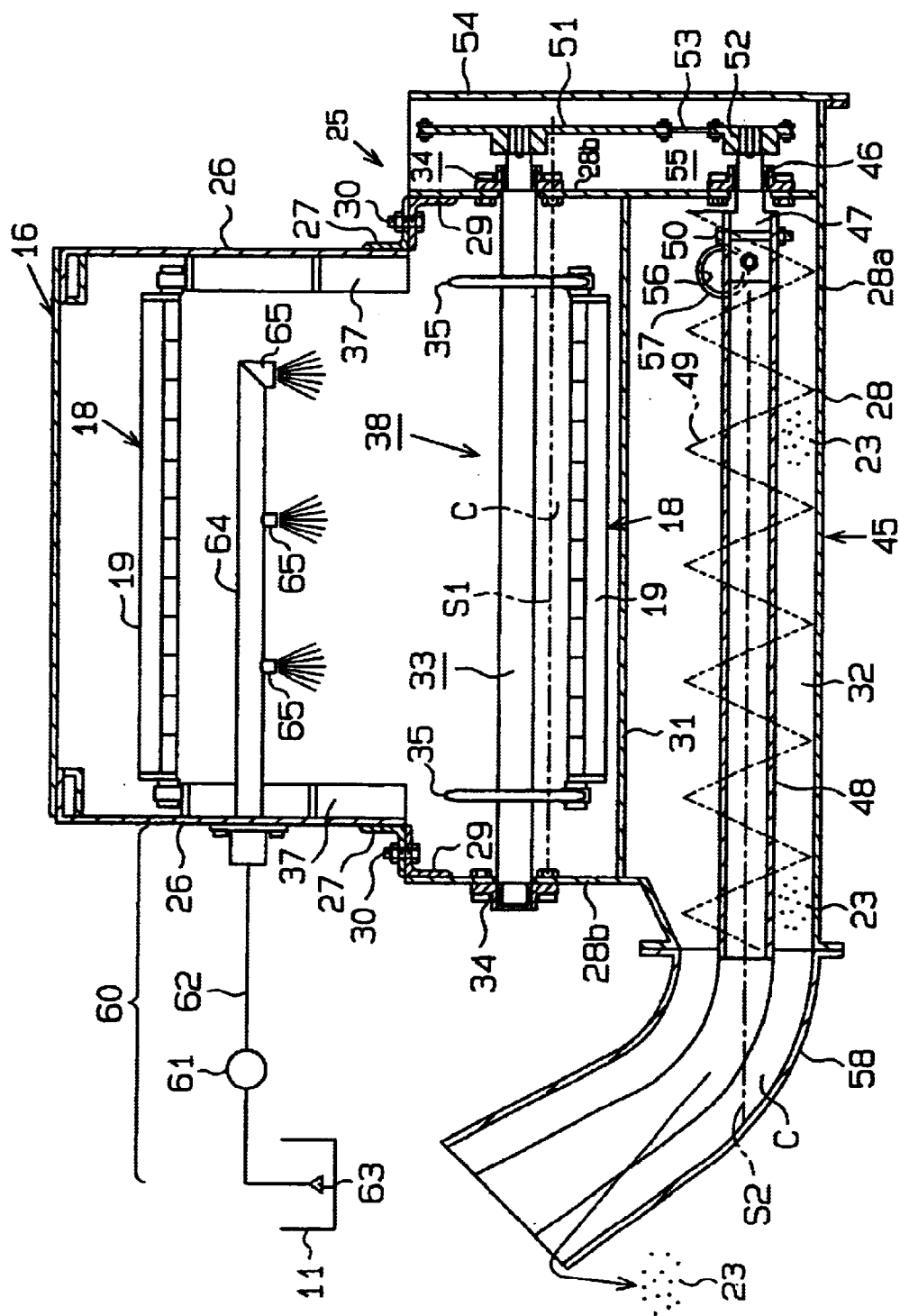
FIG. 2 is a cross-sectional view taken along the line 2—2 of FIG. 1.

Referring to FIG. 2, a discharge tube 58 that discharges the chips, which are conveyed by a screw rotor 49 of the screw conveyer 45 to the exterior, is connected to the distal end of the second liquid reservoir 32 (the discharge trough 28a). A distal portion of the screw rotor 49 is inserted in a proximal portion of the discharge tube 58 to restrict the radial position of the screw rotor 49. A distal opening of the discharge tube 58 is located at a position higher than the liquid level S2 of the coolant liquid C in the second liquid reservoir 32.

A supply device 60 for supplying the coolant liquid C to the first liquid reservoir 31 is located at the side wall 26, as viewed to the left in FIG. 2. The supply device 60 includes a pump 61 that pumps the coolant liquid from the recovery tank 11 through a pipe 62. A cleaner 63 for the coolant liquid C is located in the recovery tank 11. After being cleaned by the cleaner 63, the coolant liquid C is supplied to a coolant liquid supply pipe 64 through the pipe 62 by the pump 61. The coolant liquid supply pipe 64 is supported by the side wall 26 and includes a plurality of nozzles 65. From an inner space defined by the traveling path of the conveying member 18, the coolant liquid supply pipe 64 drops or sprays the coolant liquid C on an inner side of the conveying member 18 when the conveying member 18 is moving along the return route. The coolant liquid C moves along the conveying member 18 and is supplied to the first liquid reservoir 31.

Figure 1:
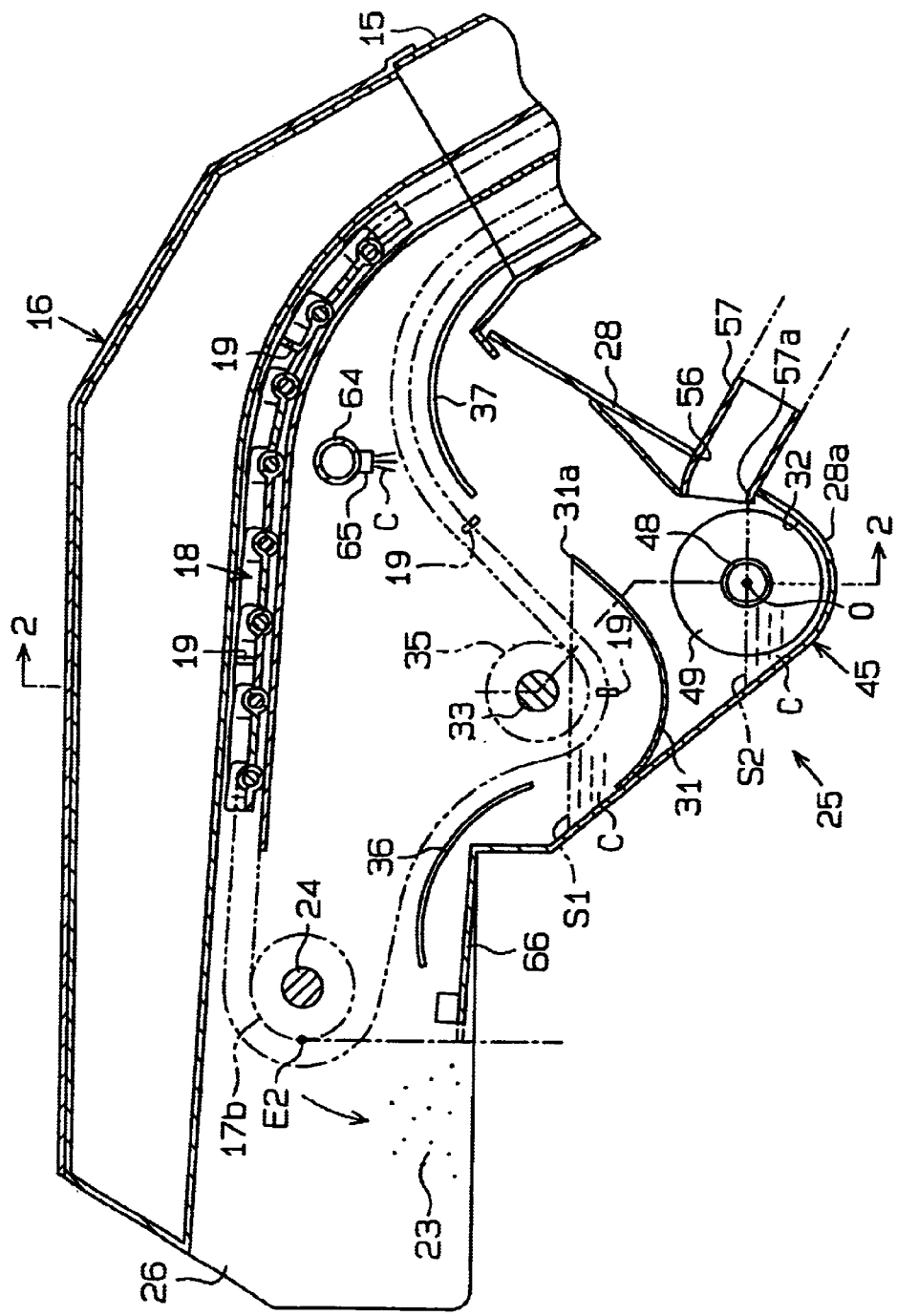
FIG. 1 is a cross-sectional view showing a chip separation/recovery apparatus in which this invention is embodied.

Referring to FIG. 1, a shooter 66, which is located at a predetermined interval spaced from the turning point E2 and at a position corresponding to a lower side of the conveying member 18 turned by the sprocket wheel 17b, is formed near an opening end of the casing 28 near the sprocket wheel 17b. Opposite ends of the shooter 66 are secured to the side walls 26, 26 through welding or by bolts. The shooter 66 guides the chips 23, the cutting oil, and the coolant liquid C that fall from the conveying member 18 to the first liquid reservoir 31.

Although a distal end of the shooter 66 may be located at the position indicated by the solid line of FIG. 1, the distal end of the shooter 66 may be located immediately close to a vertical line extending along the turning point E2 of the conveying member 18. This reduces the amount of the coolant liquid C that falls in the recovery box B1.

Next, the operations of the chip conveyer constructed as mentioned above will be described.

As shown in FIG. 3, when the coolant liquid C containing chips 23 flows into the casing 21 through the trough 22 from the machine tool MC, heavy chips 23a fall in the vicinity of the receiving position β and are recovered by the conveying member 18 between the respective scrapers 19. On the other hand, light chips 23b float on the coolant liquid at the liquid level W. Then, the heavy chips 23a and light chips 23b are conveyed by the conveying member 18 and they are moved upward in the raised portion 15 to reach the opening of the discharge portion 16. At this time, comparatively large chips 23 fall down from the conveying member 18 and are recovered by the recovery box B1.

Further, the pump 61 is driven to pump the coolant liquid C from the recovery tank 11 through the cleaner 63. The coolant liquid C is then supplied to a backside of the conveying member 18. The coolant liquid C moves along the conveying member 18 to fall in the first liquid reservoir 31, where the coolant liquid C is retained. The coolant liquid C that overflows from the opening end 31a of the first liquid reservoir 31 falls in the second liquid reservoir 32. The second liquid reservoir 32 retains the coolant liquid C in accordance with the predetermined liquid level. The liquid discharge pipe 57 returns the coolant liquid C that overflows from the second liquid reservoir 32 to the discharge starting point E1.

Some chips 23 do not fall at the turning point E2 and remain adhered to the conveying member 18 even after the sprocket wheel 17b turns the conveying member 18. The chips 23 thus enter the first liquid reservoir 31 of the chip separation recovery apparatus 25 and are immersed in the coolant liquid C. The coolant liquid C isolates the chips 23 such that the chips 23 sink in the first liquid reservoir 31. The scrapers 19, which are intermittently formed along the conveying member 18, collect the chips 23, together with the coolant liquid C, from the first liquid reservoir 31 and cause the chips 23 to fall in the second liquid reservoir 32. The second liquid reservoir 32 temporarily retains the chips 23 and the coolant liquid C.

When the circulation of the conveying member 18 rotates the support shaft 33, the drive sprocket wheel 51, the chain 53, the driven sprocket wheel 52, and the rotary shaft 47 rotate the screw rotor 49. The screw rotor 49 urges the chips 23 retained in the discharge trough 28a, or the second liquid reservoir 32, to move in the coolant liquid C toward the discharge tube 58. The chips 23 that fall from the discharge tube 58 are collected to the recovery box B2 of FIG. 2. Excessive coolant liquid C is returned from the liquid discharge pipe 57 to the recovery tank 11.

The chip separation/recovery apparatus 25 constructed as described above has the following effects.

(1) In the return route R3 of the conveying member 18, the casing 28 is attached to the lower portion of the discharge portion 16, the coolant liquid C is stored in the first liquid reservoir 31 located in the casing 28, and the conveying member 18 takes a roundabout route to advance into the liquid C. Thus, the coolant liquid C acts on chips that are adhered to the conveying member 18 by oil so that the adhesion is decreased or removed, and the chips 23 are efficiently separated from the surface of the conveying member 18 in the first liquid reservoir 31. Since oil component that exists between the conveying member 18 and the chips adheres the chips to the conveying member 18, the adhesion of the oil component is referred to as liquid crosslinking adhesion.

The principle of separating chips 23 from the surface of the conveying member 18, will be explained.

In the following discussion, it is assumed that the chips 23 are aluminum particles, and the aluminum particles are adhered to the surface of the conveying member 18 through an oil component contained in the coolant liquid in the air. In this state, liquid crosslinking adhesion by oil and van der Waals force act between the conveying member 18 and the aluminum particles, so that the aluminum particles are adhered to the conveying member 18 by both forces. The liquid crosslinking adhesion is significantly larger than the van der Waals force with respect to the entire particle diameters.

Thus, when the entire aluminum particles are exposed to the coolant liquid, the liquid crosslinking adhesion is eliminated and the particles can be in a state where they are adhered to the conveying member by only the Van der Waals force. The magnitude of the van der Waals force is further significantly reduced when the surrounding environment is liquid rather than air. As described above, the aluminum particles are efficiently separated from the conveying member 18 by reducing the adhesion.

(2) The screw conveyer 45 is provided in the vicinity of the lower portion of the first liquid reservoir 31. Therefore, the chips 23 are automatically discharged. Unlike a case where the screw conveyer 45 is provided below the recovery tank 11, the above illustrated embodiment requires no underground pit, which adds to the flexibility of and facilitates installation.

(3) The circulating movement of the conveying member 18 is used as the driving force of the screw conveyer 45. Thus, it is not necessary to additionally provide an exclusive driving source, and the structure is simplified.

(4) The distal end portion of the discharge portion 16 is opened and the chips 23 are caused to fall naturally. The chips 23 that do not fall are separated by the chip separation/recovery apparatus 25. Accordingly, the supply of the coolant liquid C supplied to the first liquid reservoir 31 set to the minimum necessity.

(5) In the embodiment, the level of the end opening of the discharge tube 58 is higher than the level of the coolant liquid C in the second liquid reservoir 32. Thus, the amount of coolant liquid adhered to the chips 23 discharged from the discharge tube 58 is reduced.

(6) Since the liquid level S1 of the coolant liquid C in the first liquid reservoir 31 is low, the surface area corresponding to the liquid level S1 is small. This reduces the immersion amount of the conveying member 18 in the coolant liquid C, thus minimizing stirring of the coolant liquid C by the conveying member 18. Accordingly, even when the coolant liquid is new, the amount of the bubbles generated by the stirring of the coolant liquid C is small. This suppresses the amount of the bubbles adhered to the conveying member 18 so that the amount of the chips 23 returned to the recovery tank 11 as caught in the bubbles becomes small.

(7) The second liquid reservoir 32 accommodates the screw conveyer 45. Further, the liquid level S2 of the coolant liquid C in the second liquid reservoir 32 is low such that the surface area corresponding to the liquid level S2 becomes small also in the second liquid reservoir 32. The bubble generation in the second liquid reservoir 32 is thus suppressed. This significantly reduces the amount of the bubbles caught in the coolant liquid C that overflows from the liquid discharge pipe 57 and returns to the recovery tank 11. Accordingly, the amount of the chips returned to the recovery tank 11 is significantly reduced.

(8) Referring to FIG. 2, the liquid discharge pipe 57 is connected to the second liquid reservoir 32, which is located at an upstream side with respect to the discharge direction of the screw conveyer 45. This arrangement enables the screw conveyer 45 to send the bubbles floating at the liquid level S2 toward the discharge tube 58, thus preventing the bubbles from being accumulated near the liquid discharge pipe 57. The amount of the bubbles that move from the liquid discharge pipe 57 to the recovery tank 11 thus becomes substantially null. As a result, the chip recovery efficiency of the chip separation recovery apparatus 25 is improved.

(9) In the return route R3, the conveying member 18 takes a lowered roundabout route and proceeds into the coolant liquid C in the first liquid reservoir 31. This minimizes the space needed for installing the first liquid reservoir 31.

(10) The casing 28 is located at the opening of the bottom plate of the trough 13 in the discharge portion 16. This simplifies the installing structure of the casing 28. Further, the casing 28 is located below a portion of the return route R3 of the conveying member 18 corresponding to the discharge portion 16. This minimizes the space needed for installing the casing 28.

(11) The shooter 66 makes it possible to easily recover the cutting oil, the coolant liquid, and the chips that are adhered to the conveying member 18 and send them to the first liquid reservoir 31.

(12) The liquid retained in the first liquid reservoir 31 is a coolant type used in machine tools. It is thus unnecessary to use a specific liquid, and the operation cost becomes low.

(13) The single motor 39 drives the conveying member 18 and the screw conveyer 45. This makes it possible for the conveying member 18 and the screw conveyer 45 to be protected by a single safety mechanism when excessive load acts on the conveying member 18 or the screw conveyer 45. Further, the control circuit of the motor 39 is simplified.

(14) The chip separation/recovery apparatus 25 includes the first liquid reservoir 31, through which the conveying member 18 passes in the return route R3, and the sprocket wheels 35, 35, which function as the wrapping mechanism 38. In addition, the casing 28 has the second liquid reservoir 32. The second liquid reservoir 32 stores some of the coolant liquid C that overflows the first liquid reservoir 31, and accommodates the screw conveyer 45. The chip separation/recovery apparatus 25, which is a unit having such devices, is removably located under the discharge portion 16. Therefore, the chip separation/recovery apparatus 25 is easily detached from and attached to the discharge portion 16.

The embodiment can be modified and embodied as follows. In the following embodiments, members having the same functions in the above-mentioned embodiment are denoted with the same reference numerals, and explanations thereof will be omitted. The advantages that are common with the above embodiment will be omitted.

Figure 4:
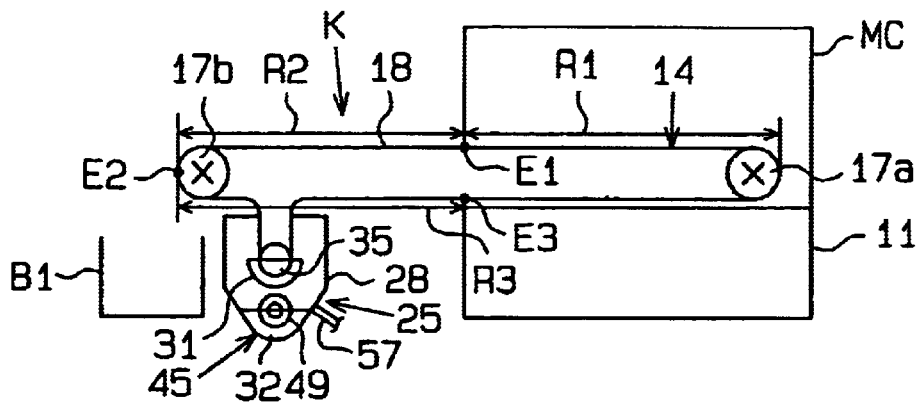
FIG. 4 is a schematic front view showing another embodiment.

As shown in FIG. 4, the conveying member 18 may be substantially horizontal and the recovery tank 11 may be located under the receiving region R1, so that the separation/recovery apparatus 25 is attached in the vicinity of the discharge portion that is spaced from the receiving region R1.

Figure 5:
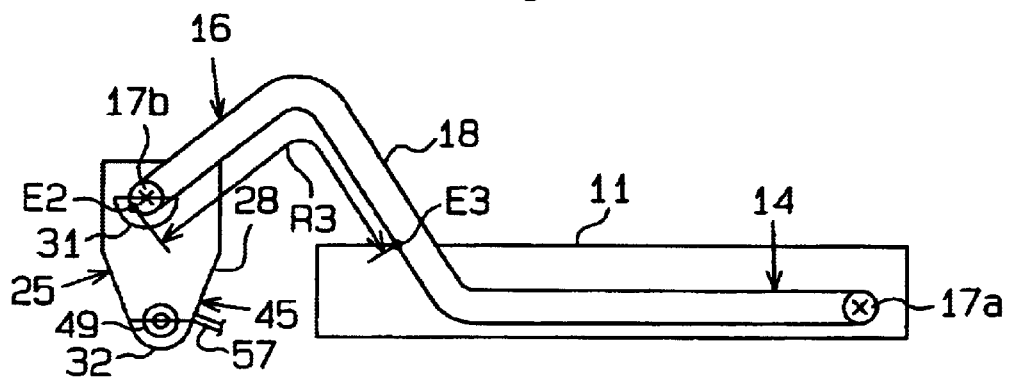
FIG. 5 is a schematic front view showing another embodiment.

As shown in FIG. 5, the distal end portion of the conveying member 18 in the discharge portion 16 may be housed in the casing 28 of the chip separation/recovery apparatus 25. In this case, all chips 23 on the conveying member 18 are recovered in the casing 28, and the structure is further simplified as compared with a structure that separates the chips 23 from the conveying member 18 before discharging.

Figure 6:
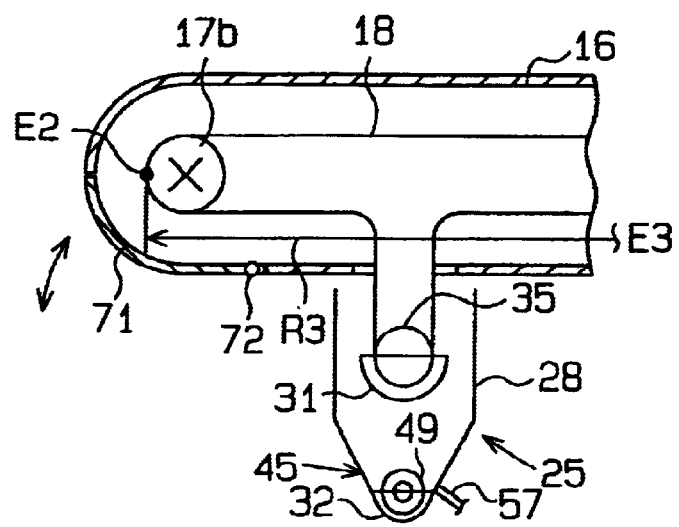
FIG. 6 is a main portion cross-sectional view showing another embodiment.

As shown in FIG. 6, a cover 71 may be rotatably supported by a shaft 72 in the distal end portion of the discharge portion 16. The cover 71 is manually or automatically controlled to open the opening of the discharge portion 16. In this case, when separation and recovery of chips that are difficult to fall down naturally from the conveying member 18 are performed, the cover 71 is closed. When chips that are easy to fall down naturally are discharged, or maintenance therefor is conducted, the cover 71 is opened.

As shown in FIG. 7, a configuration in which the discharge portion 16 is sealed tightly and the discharge portion 16 is provided with the chip separation/recovery apparatus 25 may be used. In this case, all chips 23 on the conveying member 18 are recovered in the casing 28, and the structure of the apparatus is further simplified as compared with a structure that separates the chips 23 from the conveying member 18 before discharging.

As shown in FIG. 8, the chip separation/recovery apparatus 25 may be attached to the middle of the raised portion 15. In this case, space under the raised portion 15 is effectively utilized.

With reference to FIG. 9, the casing 28 may be located in the vicinity of the recovery tank 11. In this modification, the piping for drawing the coolant liquid C from the recovery tank 11 is shortened. The installation of the casing 28 is thus simplified.

Figure 10:
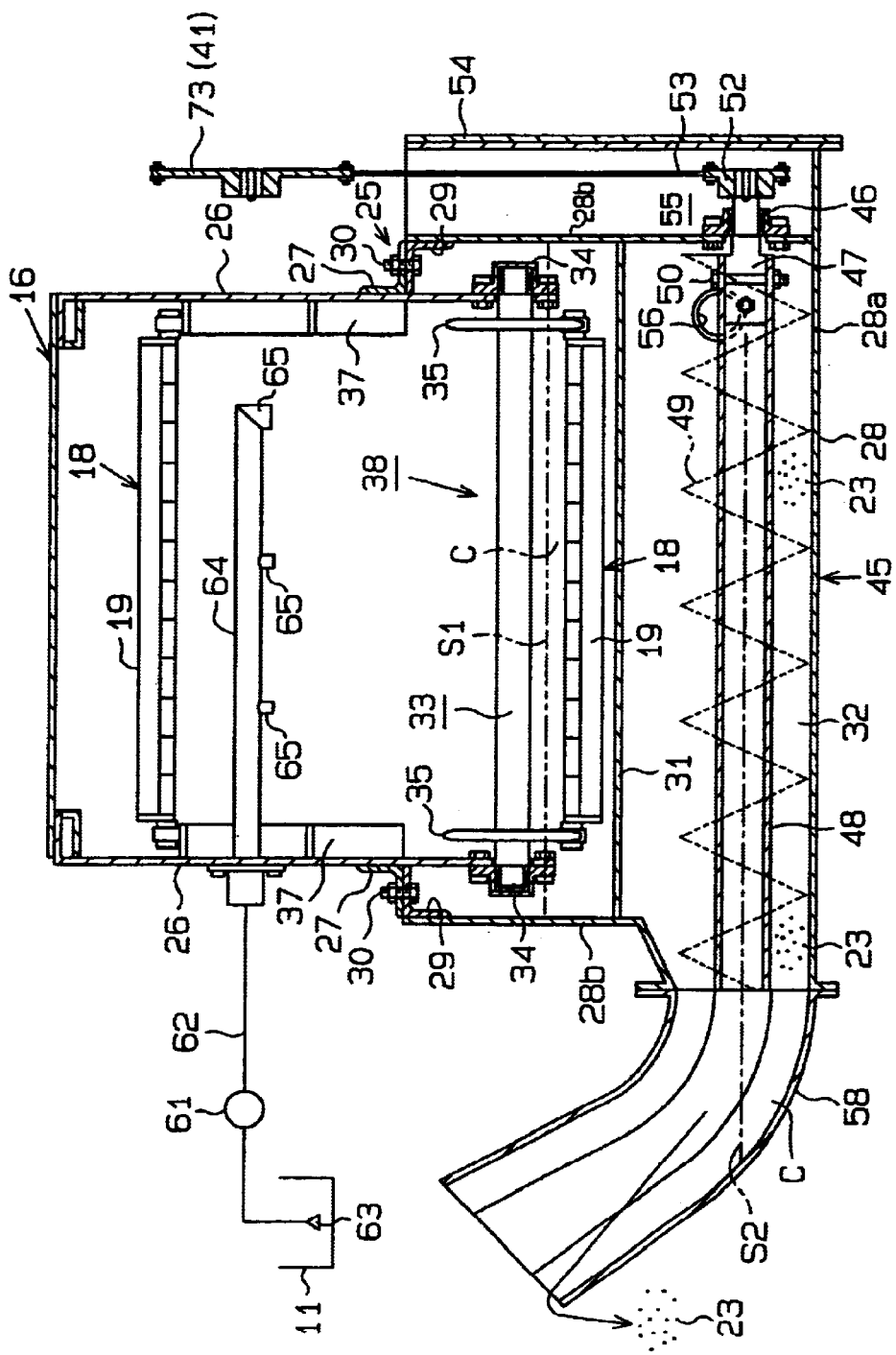
FIG. 10 is a main portion cross-sectional view showing another embodiment.
Figure 11:
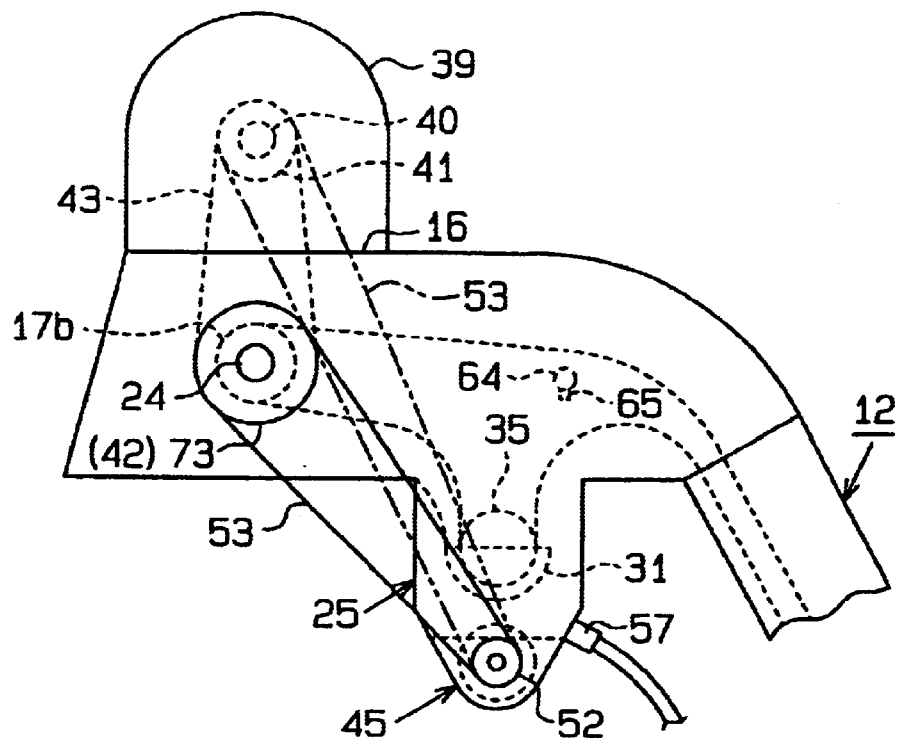
FIG. 11 is a main portion front view showing another embodiment.

In the modification of FIGS. 10 and 11, the lower ends of the side walls 26 project downward to support the support shaft 33 with the bearings 34. Further, as indicated by the solid line in FIG. 11, a sprocket wheel 73, which is different from the driven sprocket wheel 42, may be fitted to an outer end of the support shaft 24. A chain 53 connects the sprocket wheel 73 to the driven sprocket wheel 52. In addition, two drive sprocket wheels 41 may be provided such that the chain 53 connects one of the drive sprocket wheels 41 to the driven sprocket wheel 52, as indicated by the broken line in FIG. 11.

In this modification, the screw conveyer 45 and the motor 39 are rotated together appropriately to smoothly discharge the chips. Further, the common motor 39 is used for the screw conveyer 45 and the conveying member 18. This permits the conveying member 18 and the screw conveyer 45 to be protected by a single safety mechanism when excessive load acts on the conveying member 18 or the screw conveyer 45. Further, the control circuit of the motor 39 is simplified, as compared to the case in which the motors are separately provided for the conveying member 18 and the screw conveyer 45. The apparatus is thus easily fabricated.

Figure 12:
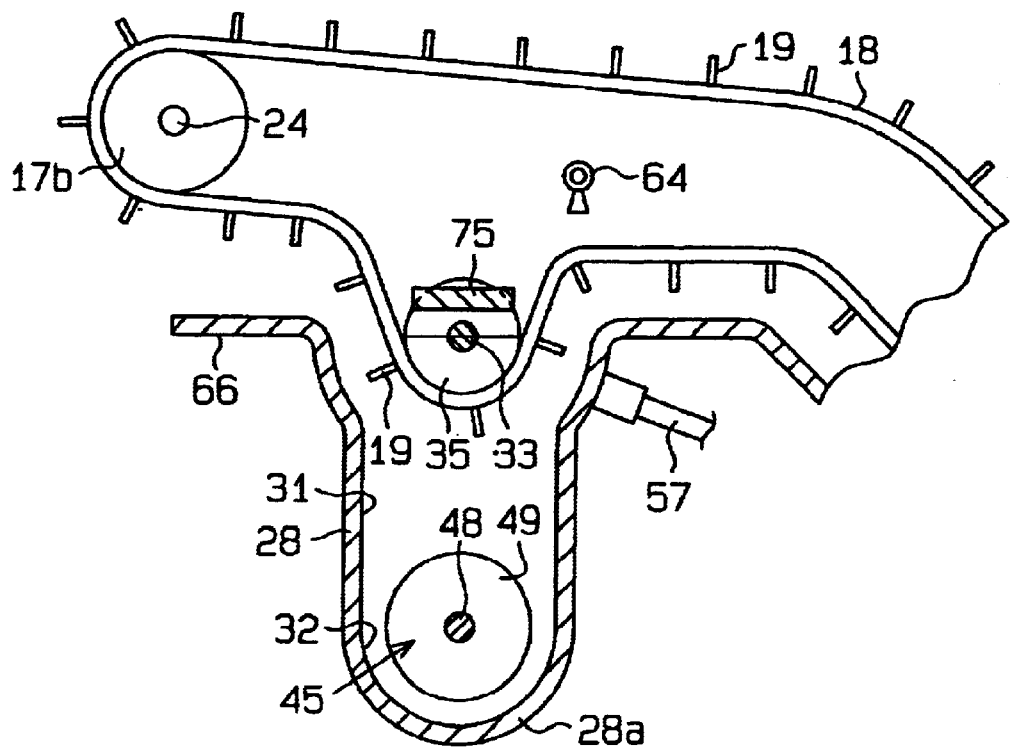
FIG. 12 is a main portion front cross-sectional view showing another embodiment.

With reference to FIG. 12, the first liquid reservoir 31 and the second liquid reservoir 32 may be formed as one liquid reservoir such that the surface area of the upper opening of the first liquid reservoir 31 becomes small. Further, a shutter plate 75 for suppressing escaping of bubbles may be located above the support shaft 33.

To suppress the escaping of bubbles, the bubbles may be drawn together with the ambient air and discharged to the recovery box B1.

Although not illustrated, the screw conveyer 40 may be driven by an independent, exclusive motor. In this case, the discharge operation of the chips 23 is properly effected by an actuating signal of the control device according to the amount of discharged chips.

Although not illustrated, an elbow-shaped discharge tube may be used. The elbow-shaped discharge tube includes a horizontal portion and a portion extending obliquely upward. The oblique portion is formed in a bugle shape so that the distal end has a larger passage surface area. In this case, the chips 23 discharged from the discharge tube 58 can be recovered by a single recovery box.

Although not illustrated, the coolant liquid supply pipe 64 may be located at an outer side the conveying member 18.

The coolant liquid supply pipe 64 may be located upstream of the conveying member 18 with respect to the first liquid reservoir 31 in the return route R3 of the conveying member 18. The coolant liquid C is sprayed or dropped on the conveying member 18 to supply the coolant liquid C to the first liquid reservoir 31, before the conveying member 18 enters the first liquid reservoir 31. In this modification, some of the chips 23 adhered to the conveying member 18 are removed before the conveying member 18 enters the first liquid reservoir 31. This structure improves the chip recovery efficiency.

In place of the coolant liquid C, for example water, cleaning fluid may be used.

In place of the screw conveyer 45, a scraping mechanism employing a scraper, a belt conveyer, a bucket conveyer or a fluid conveying mechanism may be used.

The discharge tube 58 may be flexible so that a discharge direction of the chips can be changed.

The number of the first liquid reservoir 31 and the sprocket wheels 35, which are located in the casing 28, may be increased.

With reference to FIG. 1, extended portions (not shown) may be projected inward from the opening ends of the first and second liquid reservoirs 31, 32 to cover part of the coolant liquid corresponding to the liquid levels S1, S2. In this case, the extended portions suppress escaping of bubbles.

INDUSTRIAL APPLICABILITY

In the chip conveyer according to the present invention, when the conveying member moves along the return route R3, the adhering force of the oil component, which acts to adhere the chips to the conveying member, is reduced or released in liquid. This structure efficiently removes the adhered chips from the conveying member, thus improving the durability of the conveying member and that of the drive mechanism. Further, bubble generation in the liquid is suppressed to improve the chip recovery efficiency.

What is claimed is:

1. A chip conveyer comprising an endless conveying member that circulates in a predetermined direction for receiving chips discharged from a machine tool in a receiving zone, conveying the chips to a discharge position spaced from the receiving zone at a predetermined interval, and discharging the chips at the discharge position:

wherein the receiving zone has a predetermined length corresponding to the length of the machine tool;

wherein the conveying member travels along a forward route from an end of the receiving zone to a turning point of the conveying member, discharges the chips at the turning point to a return point where the conveying member is returned to the receiving zone;

wherein the chip conveyer further comprises:

a liquid reservoir is located at a position corresponding to the return route, such that the conveying member enters the liquid reservoir while moving along the return route for separating the chips adhered to the conveying member in liquid in the liquid reservoir;

a liquid supply device for supplying the liquid to the liquid reservoir;

a chip discharge means for discharging the separated chips to the exterior is located in the liquid reservoir;

a liquid discharge means for discharging excessive liquid is located in the liquid reservoir or in the chip discharge means; and a suppressing means for suppressing escaping of bubbles from the liquid discharge means.

2. The chip conveyer according to claim 1, wherein:

the conveying member includes a scraper;

the liquid reservoir includes a first liquid reservoir;

the scraper of the conveying member causes the chips separated in the liquid in the first liquid reservoir to fall in the second liquid reservoir together with the liquid;

the second liquid reservoir accommodates the chip discharge means; and the liquid discharge means is a liquid discharge pipe connected to the second liquid reservoir.

3. The chip conveyer according to claim 2, wherein the suppressing means includes a structure that suppresses the escaping of the bubbles by reducing the volume of the liquid in the first liquid reservoir and the surface area corresponding to a liquid level of the first liquid reservoir and a structure that suppresses the escaping of the bubbles by reducing the volume of the liquid in the second liquid reservoir and the surface area corresponding to a liquid level of the second liquid reservoir.

4. The chip conveyer according to claim 3, wherein the surface areas corresponding to the liquid levels of the liquids in the first and second liquid reservoirs are reduced by lowering the liquid levels.

5. The chip conveyer according to claim 3, wherein, with respect to the chip discharge direction of the chip discharge means, the upstream end of the liquid discharge pipe is connected to the second liquid reservoir.

6. The chip conveyer according to claim 1, wherein the liquid supply device supplies the liquid to the liquid reservoir by means of the conveying member by dropping or spraying the liquid on the conveying member in the return route at an upstream or downstream position with respect to the liquid reservoir.

7. The chip conveyer according to claim 1, wherein the conveying member proceeds into the liquid of the liquid reservoir by taking a lowered roundabout route along the return route.

8. The chip conveyer according to claim 1, wherein the liquid supply device pumps the liquid from a recovery tank located in the receiving zone, and the liquid discharge means causes excessive liquid to fall in the recovery tank.

9. The chip conveyer according to claim 8, wherein the liquid supply device includes a cleaner that cleans the liquid in the recovery tank and a pump that pumps the liquid from the recovery tank, and the liquid pumped by the pump through the cleaner is supplied to the first liquid reservoir.

10. The chip conveyer according to claim 1, wherein a trough encompasses the conveying member in the forward and return routes, an opening through which the chips fall is formed at a distal end of the trough, the liquid reservoir is located under an opening formed in a bottom plate of the trough, and the conveying member takes a roundabout route to enter the liquid reservoir.

11. The chip conveyer according to claim 1, wherein a trough encompasses the conveying member in the forward and return routes, a distal end of the trough is closed, the liquid reservoir is located under an opening formed in a bottom plate of the trough, and the conveying member takes a roundabout route to enter the liquid reservoir.

12. The chip conveyer according to claim 1, wherein a shooter for collecting substance adhered to the conveying member and sending the object to the liquid reservoir is located between the turning point of the conveying member and the liquid reservoir.

13. The chip conveyer according to claim 12, wherein a distal end of the shooter is located in the vicinity of a vertical line that includes the turning point of the conveying member.

14. The chip conveyer according to claim 1, wherein the chip discharge means is driven in conjunction with the circulation of the conveying member.

15. The chip conveyer according to claim 1, wherein:
the receiving zone of the conveying member extends substantially horizontal; the forward route of the conveying member includes a raised portion, which is inclined for conveying the chips received in the receiving zone to a obliquely upward position, and a discharge portion, which horizontally conveys the chips to the discharge position;
the return route of the conveying member is substantially parallel with the forward route; and
the liquid reservoir is located below a portion of the return route corresponding to the discharge portion of the conveying member.

16. The chip conveyer according to claim 1, wherein a coolant liquid is used as the liquid for reducing or releasing adhering force.

17. The chip conveyer according to claim 1, wherein a motor drives the conveying member to circulate, and the motor also drives the chip discharge means.

18. The chip conveyer according to claim 1, wherein a motor drives the conveying member to circulate, and an additional motor drives the chip discharge means.

19. The chip conveyer according to claim 18, wherein the motor directly drives the chip discharge means.

20. The chip conveyer according to claim 1, wherein the chip discharge means includes a conveyer for conveying the chips and a discharge tube for discharging the chips.

21. A chip separation recovery apparatus for the chip conveyer according to claim 1, comprising:
a liquid reservoir for retaining liquid in which a conveying member is immersed while moving along a return route;
a turning mechanism located at a position corresponding to the liquid reservoir for causing the conveying member to take a roundabout route;
a chip discharge means for discharging chips retained in the liquid reservoir;
a liquid discharge means for discharging excessive liquid from the liquid reservoir; and
a suppressing means for suppressing escaping of bubbles from the liquid discharge means.

22. The chip separation and recovery apparatus according to claim 21, wherein:
the conveying member includes a scraper;
the liquid reservoir includes a first liquid reservoir and a second liquid reservoir located below the first liquid reservoir;
the scraper of the conveying member causes the chips separated in the liquid in the first liquid reservoir to fall in the second liquid reservoir together with the liquid;
the second liquid reservoir accommodates the chip discharge means; and
the liquid discharge means is a liquid discharge pipe connected to the second liquid reservoir.

23. The chip separation and recovery apparatus according to claim 21, wherein the chip discharge means is a screw conveyer accommodated in the second liquid reservoir.

24. The chip separation and recovery apparatus according to claim 21, wherein a discharge tube for discharging the chips is attached to the second liquid reservoir, and a distal opening of the discharge tube is located at a position higher than a liquid level of the second liquid reservoir.

* * * * *